(No Model.)
E. KOENIG.
DRILLING MACHINE FOR BUTTONS OF MOTHER-OF-PEARL.
No. 500,540. Patented June 27, 1893.
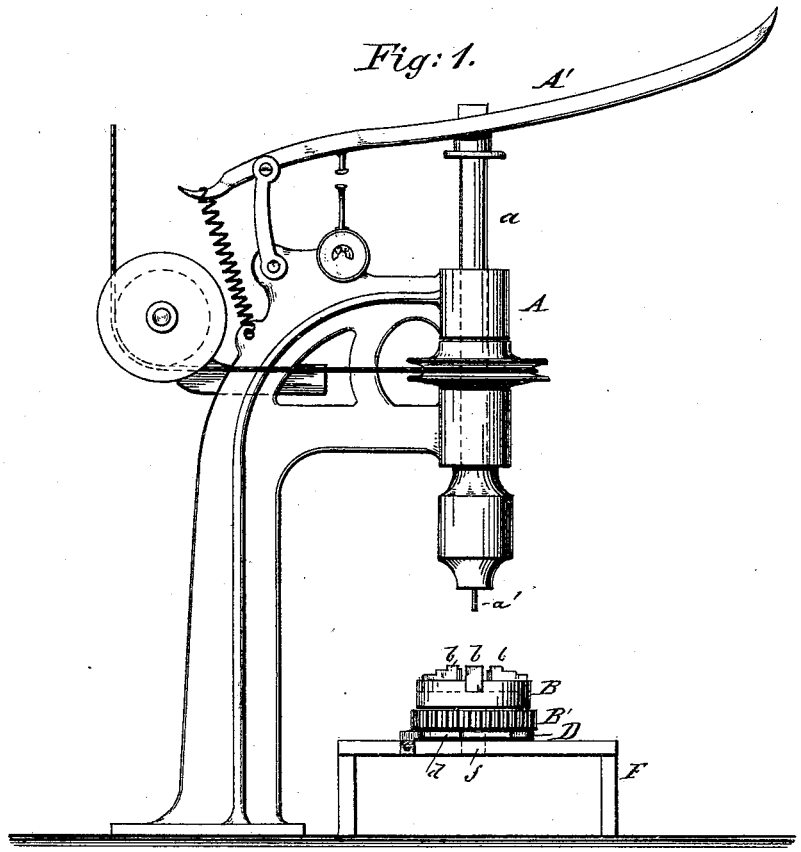
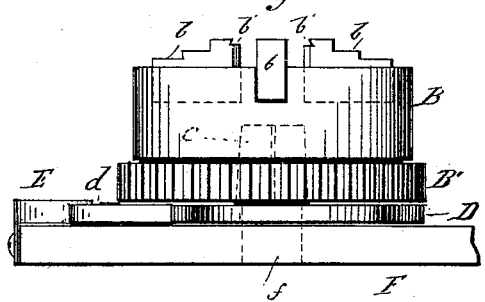
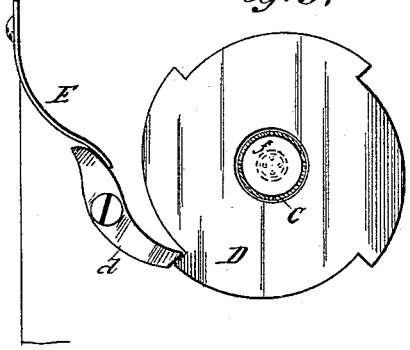
WITNESSES:
INVENTOR
ATTORNEY.

UNITED STATES PATENT OFFICE.

EMIL KOENIG, OF HICKSVILLE, ASSIGNOR TO EMIL SCHWEINBURG, OF NEW YORK, N. Y.

DRILLING-MACHINE FOR BUTTONS OF MOTHER-OF-PEARL.

SPECIFICATION forming part of Letters Patent No. 500,540, dated June 27, 1893.

Application filed November 1, 1892. Serial No. 450,649. (No model.)

*To all whom it may concern:*

Be it known that I, EMIL KOENIG, a citizen of the United States, and a resident of Hicksville, in the county of Queens and State of New York, have invented certain new and useful Improvements in Drilling-Machines for Buttons of Mother-of-Pearl, of which the following is a specification.

My invention has reference to improvements in a drilling machine for drilling holes into buttons of mother of pearl, and the invention consists of a simple attachment to such machines, by means of which four holes are successively drilled into the buttons, the machine being illustrated in the accompanying drawings, hereinafter described and subsequently pointed out in the claims.

Figure 1 is an elevation of a drilling machine with my improved attachment for drilling four hole buttons. Fig. 2 is a detail view of the button chuck, and Fig. 3 is a top view of the ratchet wheel and pawl attached to the button-chuck.

Similar letters of reference indicate corresponding parts.

A in the drawings represents a drilling-machine of the usual construction and B is a chuck of any approved construction for holding the buttons to be provided with the holes, which is turnably placed upon a hollow standard C. The jaws $b$ of the chuck are provided with notches $b'$ and are moved to or from each other by means of the adjusting hand wheel $B'$ in the usual manner. The function of such chucks is well known and the construction of the chuck used with my machine is therefore not illustrated in the drawings. A ratchet-wheel D, having four indents, is likewise placed upon the hollow standard C and so connected with the chuck that both the chuck and the ratchet-wheel are simultaneously rotated. The pawl $d$, upon which a spring E acts, presses upon the indented periphery of the ratchet-wheel, as clearly shown in Fig. 3.

The chuck and ratchet-wheel with their standard C are placed upon a frame or table F which is pivoted with a spring that corresponds with the opening in the hollow standard.

The buttons to be provided with four holes are placed upon the shoulders of the jaws of the chuck, which shoulders are formed by the notches $b'$, and then the jaws are moved toward each other by means of the adjusting hand wheel $B'$, so that the button is reliably held in the notches of the jaws. The spindle $a$ of the drilling machine is then lowered by means of the lever $A'$ and the drill $a'$ pierces the button on the respective spot. Of course the chuck must be so placed that the drill touches the right spot of the button. After one hole is thus drilled into the button the chuck and the ratchet-wheel are turned, the spindle with the drill is lifted, and to the right hand side until the pawl slips over the next indent and abuts against the same. Then a second hole is drilled into the button and the described actions of the drill, the chuck and the ratchet-wheel are repeated, until the button is provided with four holes. The jaws of the chuck are then moved from each other and the button is allowed to drop through the openings in the hollow standard C and in the table or frame F into a receptacle.

By means of the described attachment the buttons are provided with holes in a very simple manner and the work is easier and quicker done than with the drilling machines now used.

Having thus described my invention, I claim as new and desire to secure by Letters Patent—

1. In drilling machines for buttons, the combination of a chuck having jaws provided with notches, for holding the buttons to be drilled, with a ratchet-wheel simultaneously turnable with the chuck, and a spring-acted pawl pressing against the indents of the ratchet-wheel, whereby the chuck is kept in the position required for drilling the holes into the buttons, substantially as set forth.

2. In a drilling machine for buttons, the combination of a chuck, having jaws provided with notches for holding the buttons to be drilled, a ratchet-wheel, hollow standard upon which the chuck and the ratchet-wheel are rotatably mounted, spring-acted pawl pressing against the indents of the ratchet-wheel, to hold the ratchet-wheel and the chuck in a reliable position when a hole is drilled into the button, substantially as set forth.

Signed at New York, in the county of New York and State of New York, this 28th day of October, A. D. 1892.

EMIL KOENIG.

Witnesses:
CHARLES KARP,
L. E. DRUMMOND.